United States Patent
Nakada

(10) Patent No.: US 10,696,295 B2
(45) Date of Patent: Jun. 30, 2020

(54) PARKING ASSIST DEVICE

(71) Applicant: HONDA MOTOR CO., LTD., Minato-ku, Tokyo (JP)

(72) Inventor: Yuki Nakada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 176 days.

(21) Appl. No.: 15/915,189

(22) Filed: Mar. 8, 2018

(65) Prior Publication Data
US 2018/0265079 A1 Sep. 20, 2018

(30) Foreign Application Priority Data
Mar. 15, 2017 (JP) .................. 2017-049601

(51) Int. Cl.
| | | |
|---|---|---|
| *B60W 30/06* | (2006.01) | |
| *G05D 1/02* | (2020.01) | |
| *B60W 30/09* | (2012.01) | |
| *B60W 40/107* | (2012.01) | |
| *B60W 40/04* | (2006.01) | |
| *B62D 15/02* | (2006.01) | |

(52) U.S. Cl.
CPC .......... *B60W 30/06* (2013.01); *B60W 30/09* (2013.01); *B60W 40/04* (2013.01); *B60W 40/107* (2013.01); *B62D 15/0285* (2013.01); *G05D 1/0223* (2013.01)

(58) Field of Classification Search
CPC .............................. G05D 1/0223; B60W 40/04
See application file for complete search history.

(56) References Cited

U.S. PATENT DOCUMENTS

| | | | | |
|---|---|---|---|---|
| 2002/0084916 A1* | 7/2002 | Shimizu | ................ | B60Q 9/005 340/932.2 |
| 2015/0112566 A1* | 4/2015 | Takagi | ..................... | B60T 7/22 701/70 |
| 2015/0375740 A1* | 12/2015 | Okamura | .............. | B60W 30/06 701/25 |

FOREIGN PATENT DOCUMENTS

JP 2014-091492 5/2014

* cited by examiner

*Primary Examiner* — Ann Marie Antonucci
*Assistant Examiner* — Abdalla A Khaled
(74) *Attorney, Agent, or Firm* — Amin, Turocy & Watson, LLP

(57) ABSTRACT

When a driver performs a driving operation in the parking operation, a control unit of a parking assist device performs acceleration in accordance with the driving operation by the driver under a condition that a distance to a target stop position from a position of the own vehicle is larger than a predetermined distance, and after the acceleration, the control unit performs deceleration so that the own vehicle stops in a range to a limit stop position.

7 Claims, 5 Drawing Sheets

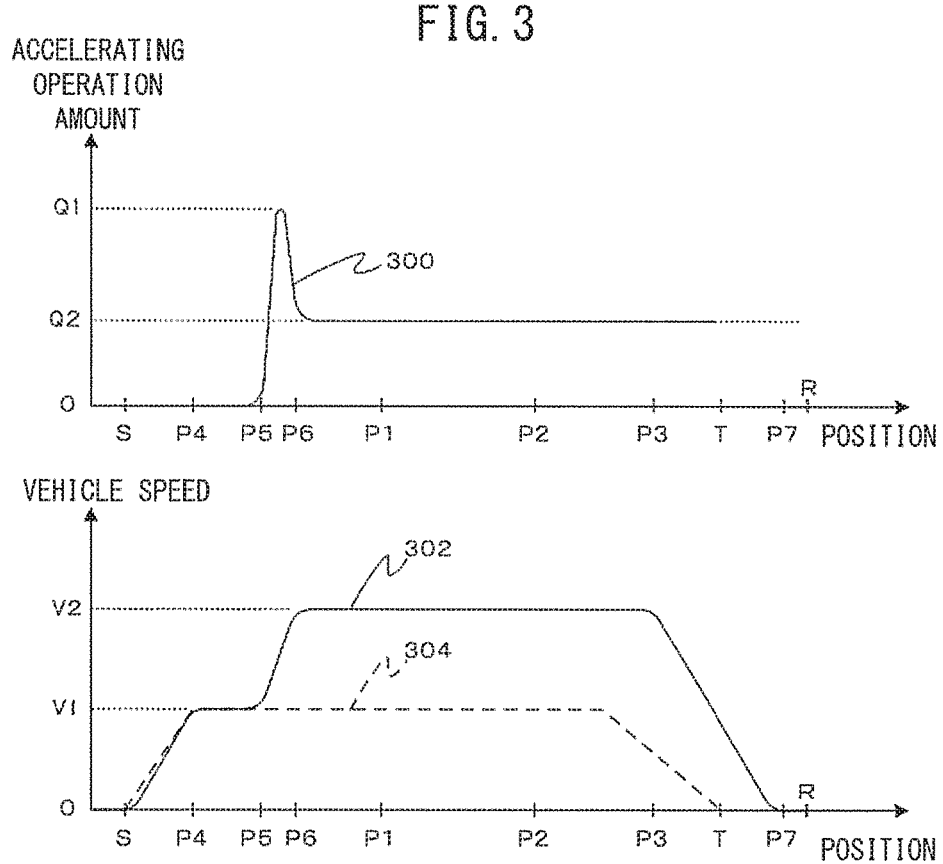

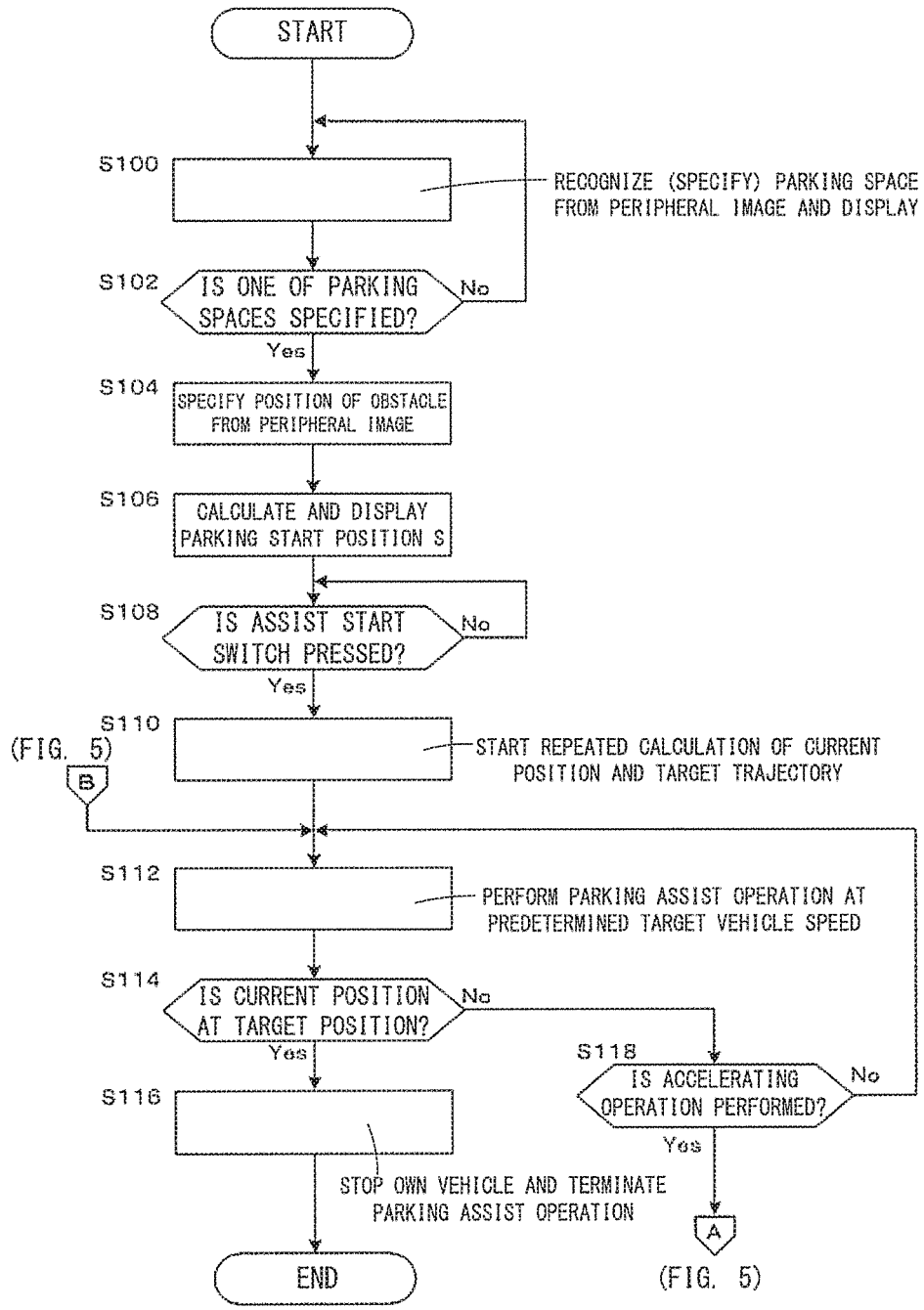

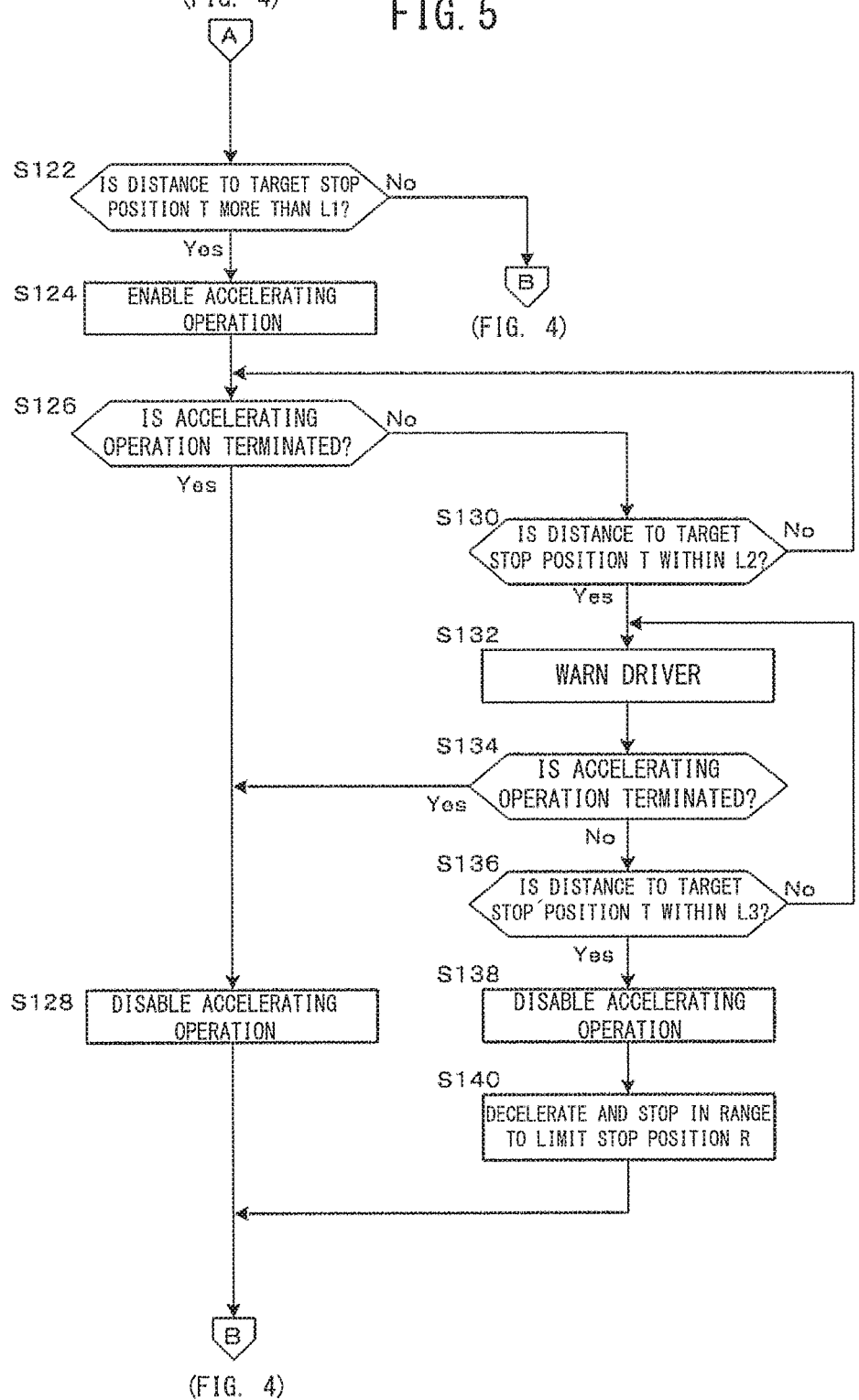

PARKING ASSIST DEVICE

CROSS-REFERENCE TO RELATED APPLICATION

This application is based upon and claims the benefit of priority from Japanese Patent Application No. 2017-049601 filed on Mar. 15, 2017, the contents of which are incorporated herein by reference.

BACKGROUND OF THE INVENTION

Field of the Invention

The present invention relates to a parking assist device that performs a parking assist operation that controls the behavior of an own vehicle until the vehicle is parked in a parking space, and particularly to a parking assist device that can reflect a driver's driving operation in the parking assist operation.

Description of the Related Art

One of the conventionally known devices for guiding an own vehicle to a parking space is a parking assist device as disclosed in Japanese Laid-Open Patent Publication No. 2014-091492. This parking assist device recognizes the positional relation of the own vehicle to the parking space through an on-vehicle camera, calculates the trajectory of the own vehicle to guide the own vehicle from the current position to the parking space with one turnabout (turning back), and controls the steering and speed of the own vehicle along the calculated trajectory.

In this device according to Japanese Laid-Open Patent Publication No. 2014-091492, if the driver steps on the brake pedal when controlling the steering and speed of the own vehicle toward the parking space after the calculation of the trajectory, the vehicle is stopped once and the control is restarted after the driver releases the brake pedal. Thus, when an obstacle comes into the parking route, for example, the contact with the obstacle is avoided by performing the driver's braking operation with priority.

In general, the parking assist operation in the parking assist device is performed sufficiently slowly so that the driver does not feel worried or scared about the contact or collision with the obstacle. Meanwhile, some drivers may feel such a speed is too slow and the parking assist device may become more useful if the speed of the parking operation can be changed in accordance with the driver's desired pace.

However, in regard to the driver's operation in the parking assist operation, the above conventional assist device merely stops temporarily the parking operation when the driver has performed the braking operation in consideration of the obstacle coming thereinto, for example.

SUMMARY OF THE INVENTION

In view of the above circumstances, a parking assist device that can adjust the speed of the own vehicle in the parking assist operation in accordance with the driver's desired pace has been anticipated.

An aspect of the present invention is a parking assist device including: a trajectory plan unit configured to plan a target trajectory of an own vehicle from a current position to a target parking space; and a control unit configured to control the own vehicle to perform a parking operation in which the own vehicle travels along the target trajectory and is parked in the target parking space. The trajectory plan unit is configured to determine a limit stop position corresponding to a limit position to which the own vehicle can travel along a traveling direction indicated by the target trajectory further forward over at least one target stop position included in the target trajectory, and when a driver performs a driving operation in the parking operation, the control unit is configured to perform acceleration in accordance with the driving operation by the driver under a condition that a distance to the target stop position from a position of the own vehicle when the driving operation is performed is larger than a predetermined distance and after the acceleration, the control unit is configured to perform deceleration so that the own vehicle stops in a range to the limit stop position.

According to another aspect of the present invention, the predetermined distance is determined as a distance where it is predicted to take a predetermined time for the own vehicle traveling at the current vehicle speed along the target trajectory to reach the target stop position.

According to another aspect of the present invention, the control unit is configured to control steering and a vehicle speed of the own vehicle and perform a steering control along the target trajectory when the acceleration is performed in accordance with the driving operation by the driver.

According to another aspect of the present invention, the deceleration performed so that the own vehicle stops in the range to the limit stop position is configured to be performed in a manner that a distance where the own vehicle travels after the own vehicle starts the deceleration and before the own vehicle stops is within a range of a predetermined stop distance; and the stop distance is shorter when an obstacle exists in front of the limit stop position than when the obstacle does not exist.

According to another aspect of the present invention, the limit stop position is located away from the target stop position by a predetermined travel allowance distance; and the travel allowance distance is shorter when the obstacle exists in front of the limit stop position than when the obstacle does not exist.

According to another aspect of the present invention, the deceleration performed so that the own vehicle stops in the range to the limit stop position is configured to be performed within a range of predetermined deceleration or jerk; and the predetermined deceleration or jerk is determined in accordance with a kind of the target stop position.

According to another aspect of the present invention, the predetermined deceleration or jerk is larger when an obstacle exists in front of the limit stop position than when the obstacle does not exist.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 shows graphs illustrating one example of a transition of an accelerating operation and a vehicle speed in the example of the parking assist operation illustrated in FIG. 2;

FIG. 4 is a flowchart of an operation procedure of a parking assist process performed by the parking assist device illustrated in FIG. 1; and FIG. 5 is a flowchart of the operation procedure of the parking assist process performed by the parking assist device illustrated in FIG. 1.

DESCRIPTION OF THE PREFERRED EMBODIMENTS

An embodiment of the present invention will hereinafter be described with reference to the drawings.

Figure 1:
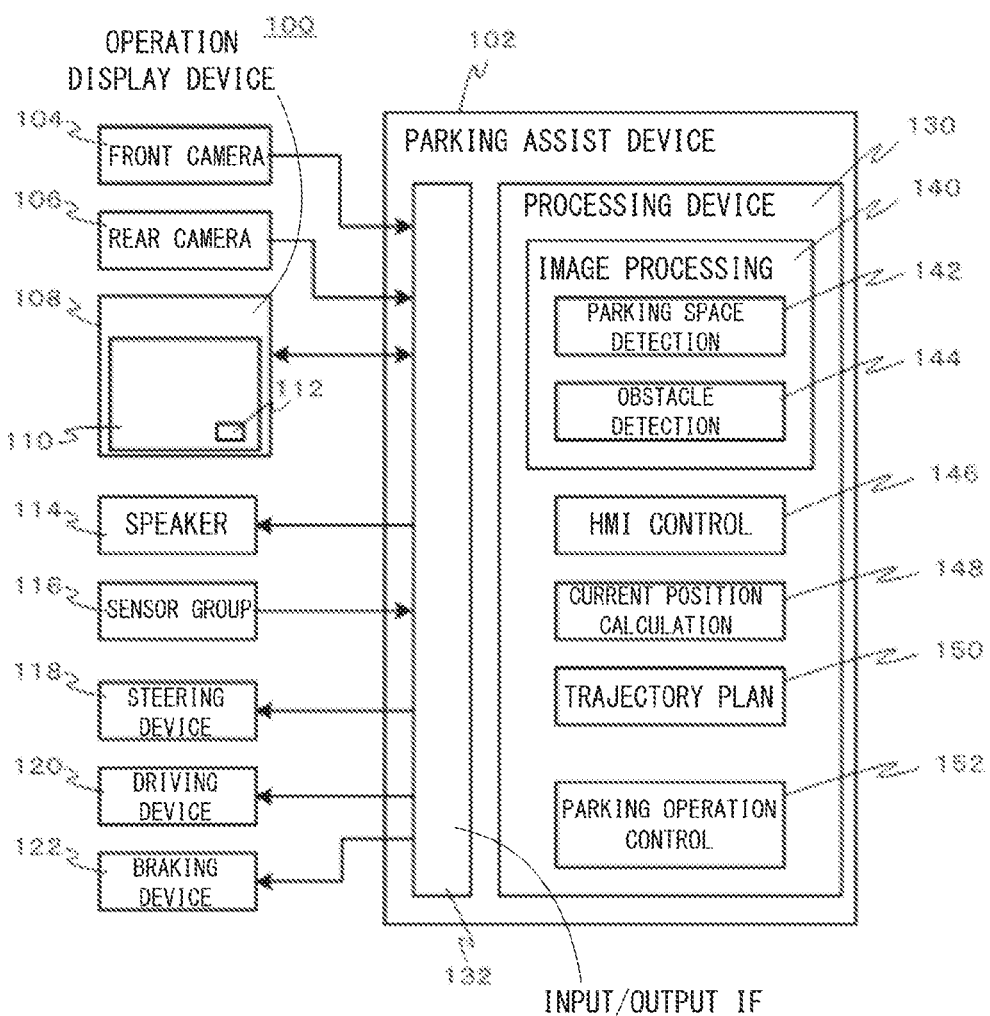
FIG. 1 is a diagram illustrating a structure of a parking assist device and a structure of a parking assist system using the parking assist device according to one embodiment of the present invention.

FIG. 1 is a diagram illustrating a structure of a parking assist device and a structure of a parking assist system using the parking assist device according to one embodiment of the present invention. The present parking assist system 100 includes a parking assist device 102 according to one embodiment of the present invention, and is mounted on a vehicle to assist the parking operation performed by a driver of the vehicle. Here, the vehicle on which the parking assist system 100 including the parking assist device 102 is mounted is referred to as an own vehicle.

The parking assist system 100 includes, in addition to the parking assist device 102, a front camera 104 that photographs a front environment of the own vehicle and a rear camera 106 that photographs a rear environment of the own vehicle. Images photographed by the front camera 104 and the rear camera 106 are processed by an image processing unit 140 of the parking assist device 102 that is described below, and are converted into, for example, a bird's-eye view image in which the own vehicle is viewed from above. Note that, in addition to the front camera 104 and the rear camera 106, the parking assist system 100 may include two side cameras that photograph left and right environments of the own vehicle, and additionally based on images photographed by the side cameras, the bird's-eye view image may be generated.

The parking assist system 100 further includes an operation display device 108 and a speaker 114. The operation display device 108 corresponds to a display device that displays the bird's-eye view image and the like and also corresponds to an operation device through which an occupant of the own vehicle inputs his instruction or data. The operation display device 108 may be, for example, a liquid crystal display device including a touch panel (for example, a touch screen device) or the like.

In the present embodiment, the operation display device 108 includes a display unit 110 that displays an image, and the display unit 110 displays an assist start switch 112 by an HMI control unit 146 to be described below. The assist start switch 112 is operated by the occupant of the own vehicle. The touch panel (not shown) detects whether the assist start switch 112 is pressed and the result of the detection is output to the HMI control unit 146 that will be described below.

The parking assist system 100 further includes a sensor group 116. The sensor group 116 includes various sensors that detect the operation state of the own vehicle. For example, the sensor group 116 includes a travel distance sensor that detects the travel distance of the own vehicle, a yaw rate sensor that detects a change in a traveling direction of the own vehicle, an accelerator pedal sensor that detects an operation state of a driving operation element such as an accelerator pedal by the occupant, and a brake pedal sensor that detects an operation state of a braking operation element such as a brake pedal by the occupant. In the description below, for example, the accelerator pedal and/or the brake pedal is operated by the occupant; however, the present invention is not limited to this structure, and instead of the accelerator pedal and the brake pedal, any other driving operation element and braking operation element for the occupant to perform the driving operation and the braking operation may be operated and detected.

In addition, the parking assist system 100 includes a steering device 118 that controls the traveling direction of the own vehicle, a driving device 120 that drives the own vehicle by an internal-combustion engine and/or a motor, for example, and a braking device 122 that decelerates the own vehicle. In the present embodiment, the driving device 120 includes a function of a transmission that switches between a forward movement and a backward movement of the own vehicle.

The parking assist device 102 includes a processing device 130 and an input/output interface (input/output IF) 132. The input/output IF 132 is an interface to exchange signals or information between on-vehicle components such as the front camera 104, and the processing device 130. For example, in a case where each of the on-vehicle components includes one or a plurality of electronic control units (ECUs) or is controlled by one or a plurality of ECUs, the input/output IF 132 may include a transmission and reception device for communicating with such ECUs (for example, control area network (CAN) communications).

The processing device 130 is a computer including a processor such as a central processing unit (CPU), a read only memory (ROM) in which programs are written, a random access memory (RAM) for storing data temporarily, and the like, and includes the image processing unit 140, the human machine interface (HMI) control unit 146, a current position calculation unit 148, a trajectory plan unit 150, and a parking operation control unit 152. Here, the image processing unit 140 includes a parking space detection unit 142 and an obstacle detection unit 144.

Each unit of the processing device 130 is achieved when the processing device 130 corresponding to a computer executes programs, and such computer programs can be stored in an arbitrary computer-readable storage medium. Instead of this or in addition to this, the units may be entirely or partly structured by hardware including one or more electronic circuit components.

The image processing unit 140 generates a bird's-eye view image in which the own vehicle and its peripheral environment are viewed from above on the basis of images (own vehicle peripheral images) of the front environment and the rear environment of the own vehicle that are photographed by the front camera 104 and the rear camera 106. The image processing unit 140 performs an image recognition process on the images of the front environment and the rear environment. By this process, the parking space detection unit 142 can recognize one or a plurality of parking spaces existing around the own vehicle and specify the position of the parking space (including the range), and moreover the obstacle detection unit 144 can specify the position of one or a plurality of obstacles (including the range) existing around the own vehicle.

The HMI control unit 146 causes the display unit 110 of the operation display device 108 to display the bird's-eye view image generated by the image processing unit 140, and moreover display a frame-shaped icon expressing the position (and the range) of the parking space specified by the parking space detection unit 142 so as to overlap the icon with the bird's-eye view image displayed in the display unit 110. The HMI control unit 146 displays the outline of the obstacle or the like, which expresses the position (and the range) of the obstacle around the own vehicle that is specified by the obstacle detection unit 144, so as to overlap the outline with the bird's-eye view image displayed in the display unit 110. The HMI control unit 146 displays the assist start switch 112 at a position that is in an image display region in the display unit 110 of the operation display device 108 and that does not interrupt the display of the bird's-eye view image.

In addition, when one of the frame-shaped icons displayed in the display unit 110 of the operation display device 108 is pressed, for example, by the occupant of the own vehicle to specify the parking space that is expressed by the pressed one of the frame-shaped icons (that is, one of the parking spaces displayed in the display unit 110), the HMI control unit 146 obtains from the operation display device 108, the image positional information expressing the position of the specified parking space or frame-shaped icon on the image in the display unit 110. Based on the obtained image positional information and the image processing result of the image processing unit 140, the HMI control unit 146 outputs the relative positional information of the specified parking space relative to the own vehicle to the trajectory plan unit 150 to be described below.

The HMI control unit 146 obtains from the operation display device 108, the information as to whether the assist start switch 112 displayed in the display unit 110 of the operation display device 108 is pressed. If the assist start switch 112 is pressed, this pressing is notified to the current position calculation unit 148, the trajectory plan unit 150, and the parking operation control unit 152 that are described below.

Furthermore, the HMI control unit 146 displays the target trajectory and the assist operation start position calculated by the trajectory plan unit 150 to be described below, so as to overlap the target trajectory and the assist operation start position with the bird's-eye view image displayed in the display unit 110.

In accordance with the instruction from the parking operation control unit 152 to be described below, the HMI control unit 146 displays a warning display in the display unit 110 of the operation display device 108 and outputs a warning sound and/or a warning message through the speaker 114, so that the driver is warned to stop the accelerating operation. Here, examples of the warning display include the warning message, the blinking of the display, and the change in display color.

When the current position calculation unit 148 receives the information that the assist start switch 112 is pressed from the HMI control unit 146, the current position calculation unit 148 calculates the position of the own vehicle. Specifically, the position of the own vehicle when the assist start switch 112 is pressed is used as the original point, and by using the sensor information in regard to the travel distance and the traveling direction of the own vehicle obtained from the sensor group 116, the current position calculation unit 148 calculates the subsequent positions of the own vehicle (current position in every calculation) by odometry. The calculated current position is output to the trajectory plan unit 150 and the parking operation control unit 152 to be described below.

The trajectory plan unit 150 corresponds to a trajectory plan part. When having received the relative positional information on the parking space specified by the occupant from the HMI control unit 146, the trajectory plan unit 150 calculates the trajectory for parking the own vehicle in the specified parking space (target parking space), and calculates the assist operation start position S (for example, the position where a front end of the own vehicle should be placed when the assist operation is started) corresponding to a position where the parking assist operation for performing the parking assist operation along the trajectory is started, on the basis of the relative positional information, the bird's eye-view image generated by the image processing unit 140, and the position of the obstacle specified by the obstacle detection unit 144. Then, the trajectory plan unit 150 outputs the information on the calculated assist operation start position S to the HMI control unit 146.

When having received the information that the assist start switch 112 displayed in the display unit 110 of the operation display device 108 is pressed from the HMI control unit 146, the trajectory plan unit 150 calculates the target trajectory corresponding to the trajectory for moving the own vehicle from the current position to the target position D in the target parking space on the basis of the current position calculated by the current position calculation unit 148 at predetermined time intervals. Here, the target trajectory that is calculated includes information of a stop position to avoid an obstacle and a stop position to perform the turnabout of the own vehicle (switching between the forward movement/backward movement, or turning back) toward the target position D in the target parking space. The trajectory plan unit 150 outputs the information of the calculated target trajectory to the HMI control unit 146 and the parking operation control unit 152 that is described below.

The parking operation control unit 152 corresponds to a control part. The parking operation control unit 152 starts the parking assist process when the parking operation control unit 152 has received from the HMI control unit 146, the information that the assist start switch 112 displayed in the display unit 110 of the operation display device 108 is pressed. In the parking assist process, the parking operation control unit 152 causes the own vehicle to travel along the target trajectory calculated by the trajectory plan unit 150 at predetermined time intervals by controlling the traveling direction of the own vehicle, the vehicle speed, and the switching between the forward movement and the backward movement using the steering device 118, the driving device 120, and the braking device 122.

In particular, in the present embodiment, assuming that the target stop position T is at least one position where the own vehicle stops when the own vehicle travels along the target trajectory (for example, the stop position to avoid the obstacle, the stop position for the turnabout, and/or the target position D corresponding to the stop position in the parking space), the trajectory plan unit 150 calculates a limit stop position R corresponding to a limit position to which the own vehicle can travel over the target stop position T along the traveling direction indicated by the target trajectory. Here, the distance from the target stop position T to the limit stop position R (travel allowance distance) can be a predetermined distance. For example, the travel allowance distance can be shorter when there is an obstacle around the target stop position T (for example, in front of the own vehicle along the target trajectory) than when there is no obstacle around the target stop position T.

In the present embodiment, in particular, when the driver performs the accelerating operation after starting the parking assist operation, the parking operation control unit 152 enables the accelerating operation by the driver under the condition that the own vehicle exists at the position located away from the target stop position T by a distance more than a predetermined distance L1 on the near side along the target trajectory. Also, the parking operation control unit 152 continues the steering control along the target trajectory while the acceleration is performed in accordance with the accelerating operation. After that, when the own vehicle comes to the position within a predetermined distance L2 from the target stop position T along the target trajectory, the parking operation control unit 152 instructs the HMI control unit 146 to display a warning display in the display unit 110 of the operation display device 108, and/or outputs a warning sound and/or a warning message through the speaker 114; thus, the driver is warned to stop the accelerating operation.

Then, when the own vehicle has come to the position within a predetermined distance L3 from the target stop position T along the target trajectory without the driver stopping the accelerating operation, the parking operation control unit 152 disables the accelerating operation of the driver and controls the braking device 122 to perform the deceleration; thus, the own vehicle is stopped in the range to the limit stop position R. After that, the parking operation control unit 152 continues the parking assist operation in a range of a predetermined target vehicle speed in accordance with the target trajectory calculated by the trajectory plan unit 150 at predetermined time intervals.

That is to say, in the present embodiment, when the parking assist operation is performed along the target trajectory, the travel of the own vehicle to the limit stop position R over the target stop position T is allowed, and under the condition that the driver has started the accelerating operation at the position located away from the target stop position T by a distance more than the predetermined distance L1 on the near side, the acceleration in accordance with the accelerating operation is allowed in the range of a distance more than the predetermined distance L3 from the target stop position T on the near side, and within the range of the predetermined distance L3, the accelerating operation is disabled to stop the own vehicle in the range to the limit stop position R. Thus, in the present embodiment, the parking assist operation can be performed with the speed desired by the driver and additionally, the own vehicle can be prevented from deviating largely from the target stop position T and colliding with the obstacle or from endangering traffic participants around the own vehicle (such as other vehicle and pedestrian).

The values of the predetermined distances L1, L2, and L3 may be determined in accordance with the kind of the target stop position T (for example, the stop position to avoid the obstacle, the stop position for the turnabout, or the target position D corresponding to the stop position in the parking space). For example, the values of the predetermined distances L1, L2, and L3 can be larger (longer) in the case where the target stop position T is the stop position to avoid the obstacle than in the case where the target stop position T is the stop position for the turnabout or the stop position in the parking space.

Figure 2:
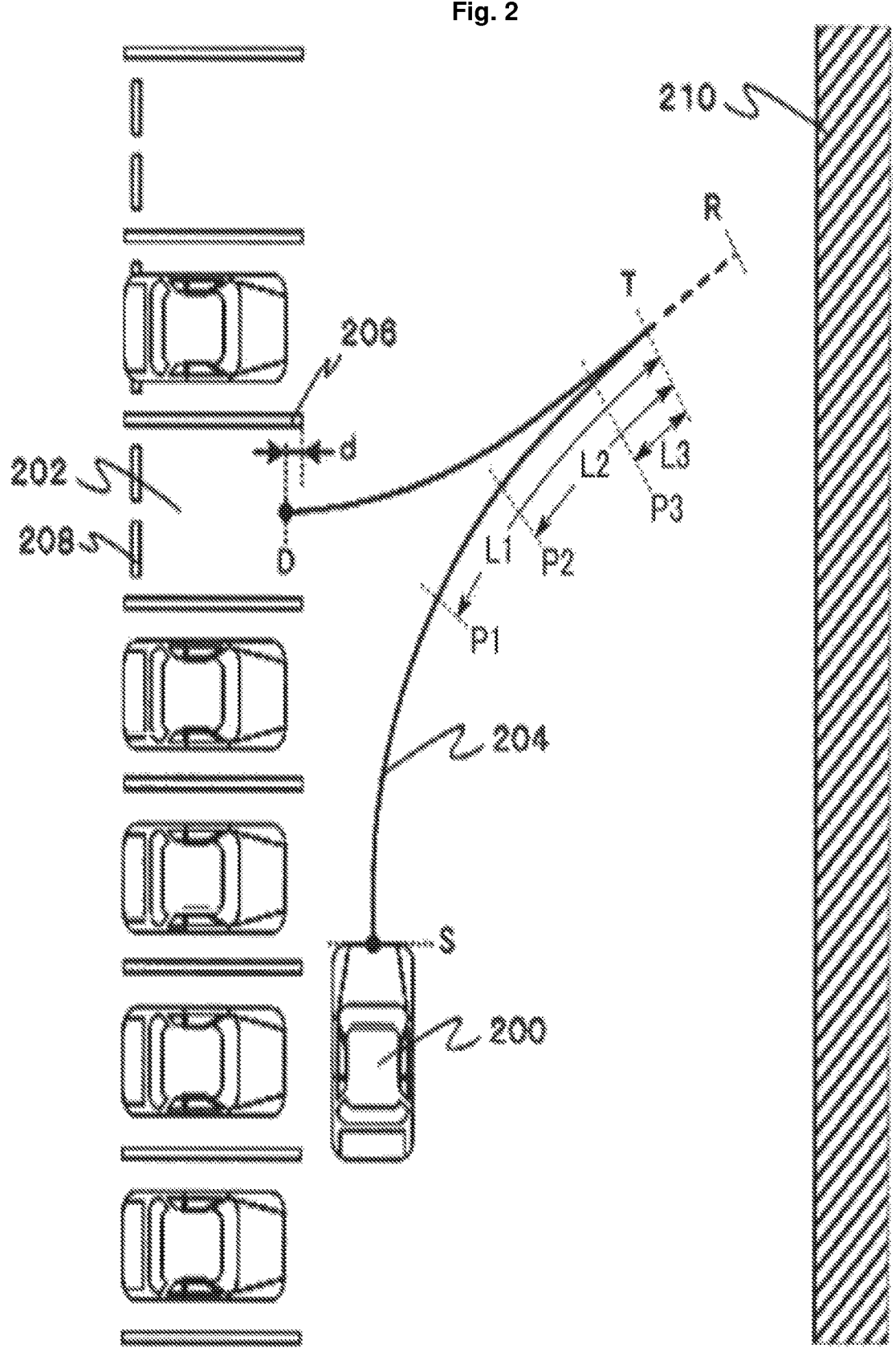
FIG. 2 is a diagram illustrating one example of a parking assist operation performed by the parking assist device illustrated in FIG. 1.

FIG. 2 is a diagram illustrating one example of the parking assist operation performed by the parking assist device 102. In the illustrated example, the stop position for the turnabout is set as the target stop position T.

In the example in FIG. 2, a parking space 202 is specified as the target parking space by the operation display device 108 of an own vehicle 200, and when the front end of the own vehicle 200 has come to the assist start position S, the occupant presses the assist start switch 112 of the own vehicle 200 and a target trajectory 204 to the target position D in the target parking space 202 is calculated. In this example, the target trajectory 204 is shown as the trajectory that should be drawn by a central part of the front end of the own vehicle 200 in the vehicle width direction. The target position D is, for example, a position inside the parking space indicated by a parking line 206, the position located away from the end of the parking line 206 by a predetermined distance d, or a position where the rear wheels of the own vehicle 200 are in contact with wheel stoppers 208 provided in the parking space.

The target parking space 202 exists on the left side in front of the own vehicle 200, and an obstacle 210 (for example, wall) exists on the right side in front of the own vehicle 200. Moreover, the target trajectory 204 includes the stop position for the turnabout as the target stop position T, and the limit stop position R relative to the target stop position T is also calculated. In addition, in FIG. 2, the positions located away from the target stop position T on the near side (toward the own vehicle 200) along the target trajectory 204 by the predetermined distances L1, L2, and L3 are shown as positions P1, P2, and P3, respectively.

When the own vehicle 200 (specifically, the front end of the own vehicle 200) is in the range from the assist start position S to the position P1, the parking assist device 102 allows the driver to accelerate through the accelerating operation and the acceleration is started in accordance with the accelerating operation. Then, the started accelerating operation is allowed to continue until the own vehicle 200 reaches the position P3. At the position P2, the parking assist device 102 just starts the warning to encourage the driver to stop the accelerating operation, and allows the continuation of the accelerating operation.

Then, when the own vehicle 200 has reached the position P3 without the stop of the accelerating operation, the parking assist device 102 disables the accelerating operation of the driver and causes the braking device 122 to start the deceleration, for example, within the range of a predetermined deceleration and/or jerk and stops the own vehicle 200 within a range not over the limit stop position R.

FIG. 3 shows graphs illustrating one example of the transition of the accelerating operation and the vehicle speed in the example of the parking assist operation illustrated in FIG. 2. In the upper graph in FIG. 3, the vertical axis indicates the operating amount of the accelerating operation by the driver (accelerating operation amount) and the horizontal axis indicates the distance measured along the target trajectory 204. In the lower graph in FIG. 3, the vertical axis indicates the vehicle speed of the own vehicle and the horizontal axis indicates the distance measured along the target trajectory 204. In FIG. 3, lines 300 and 302 indicate the transition of the accelerating operation amount and the transition of the actual vehicle speed. A line 304 (dotted line in FIG. 3) indicates the transition of the target vehicle speed in the parking assist operation in the case where the accelerating operation is not performed. The target vehicle speed is described as the predetermined vehicle speed in the programs to be executed by, for example, the processing device 130. In order to avoid the redundant description, the lines 300, 302, 304 are hereinafter referred to as the accelerating operation amount 300, the actual vehicle speed 302, and the target vehicle speed 304, respectively.

In the example in FIG. 3, the actual vehicle speed 302 increases gradually from the assist start position S along the target vehicle speed 304, and reaches a certain value V1 at a position P4. After that, at a position P5 between the assist start position S and the position P1, the driver starts the accelerating operation. In the illustrated example, after reaching the maximum value Q1, the accelerating operation amount 300 by the driver decreases and after a position P6, the accelerating operation amount 300 is maintained at a certain value Q2.

Since the position where the driver has started the accelerating operation is the position P5 between the assist start position S and the position P1, the parking operation control unit 152 enables the accelerating operation. Thus, the actual vehicle speed 302 increases gradually deviating from the target vehicle speed 304 at the position P5, and reaches a vehicle speed V2 at the position P6, and then the actual vehicle speed 302 is maintained at the vehicle speed V2.

After that, when the own vehicle 200 has reached the position P3 while the accelerating operation amount 300 is maintained at the certain value Q2, the parking operation control unit 152 starts the braking and for example, decelerates within the range of a predetermined deceleration and/or jerk, and as a result, the own vehicle 200 stops at a position P7 just before reaching the limit stop position R.

Next, an operation of the parking assist device 102 is described. The parking assist device 102 performs the parking assist process illustrated in FIG. 4 and FIG. 5 when the power is turned on. FIG. 4 and FIG. 5 are flowcharts of an operation procedure of the parking assist process. Note that after the power of the parking assist device 102 is turned on, the parking assist device 102 causes the image processing unit 140 to process the images around the own vehicle photographed by the front camera 104 and the rear camera 106 at certain time intervals, generates the bird's-eye view image in which the own vehicle and its periphery are viewed from above, and causes the display unit 110 of the operation display device 108 to display the generated bird's-eye view image through the HMI control unit 146.

When the parking assist process is started, the parking assist device 102 first causes the parking space detection unit 142 of the image processing unit 140 to perform the image processing on the images around the own vehicle photographed by the front camera 104 and the rear camera 106 and specify one or a plurality of parking spaces around the own vehicle. Then, the parking assist device 102 displays the icon expressing the area of the specified parking space (for example, the icon expressing the parking line) so as to overlap the icon with the bird's-eye view image displayed in the display unit 110 of the operation display device 108 through the HMI control unit 146 (S100). Note that the parking space can be specified in a manner that, for example, the parking space detection unit 142 recognizes the parking line (for example, white line) drawn on the road surface in the image around the own vehicle.

In this image, the occupant of the own vehicle can specify one of the parking spaces displayed in the display unit 110 by touching (or pressing) one of the icons displayed in the display unit 110.

The parking assist device 102 causes the HMI control unit 146 to determine whether the occupant has specified one of the parking spaces on the display unit 110 by the above operation (S102) and if the occupant has not specified (No in S102), the process returns to step S100 and the process is repeated. This causes the display unit 110 to display the parking spaces around the own vehicle one after another as the own vehicle travels.

On the other hand, if the occupant has specified one of the displayed parking spaces (S102, Yes), the parking assist device 102 causes the obstacle detection unit 144 of the image processing unit 140 to specify the presence or absence of the obstacle around the own vehicle (for example, the obstacle in a predetermined distance range from the vehicle or other vehicle existing next to the target parking space) and the position of the obstacle from the images around the own vehicle photographed by the front camera 104 and the rear camera 106 (S104). The specified parking space is hereinafter referred to as the target parking space.

Next, the parking assist device 102 causes the trajectory plan unit 150 to calculate the trajectory for parking the own vehicle in the target parking space on the basis of the position of the specified obstacle, for example. Also, the parking assist device 102 causes the trajectory plan unit 150 to calculate the assist operation start position S corresponding to the start position of the parking assist operation for performing the parking assist operation along the trajectory (for example, the position where the front end of the own vehicle should be disposed when the assist operation is started). Subsequently, the parking assist device 102 causes the display unit 110 to display a mark (or an icon) expressing the calculated parking start position through the HMI control unit 146 (S106). At this time, the HMI control unit 146 causes the display unit 110 to display the assist start switch 112. On the other hand, after moving the own vehicle to the parking start position S, the driver presses the assist start switch 112 displayed in the display unit 110.

The parking assist device 102 determines whether the assist start switch 112 of the display unit 110 is pressed through the HMI control unit 146 (S108), and if it is not pressed (S108, No), the process returns to step S108 and the pressing of the switch is awaited. On the other hand, if the assist start switch 112 is pressed (S108, Yes), the parking assist device 102 causes the current position calculation unit 148 to start the repeated calculation of the current position of the own vehicle and causes the trajectory plan unit 150 to start the repeated calculation of the target trajectory from the current position of the own vehicle (S110).

After that, until the parking assist process ends, the current position calculation unit 148 performs the repeated calculation of the current position of the own vehicle on the basis of the sensor information obtained from the sensor group 116 at predetermined time intervals, and the trajectory plan unit 150 calculates the target trajectory from the calculated current position of the own vehicle to the target parking space at predetermined time intervals. Here, the target trajectory is the trajectory where the central point of the front end of the own vehicle moves from the current position to the target position D in the target parking space (i.e., the position where the central point of the front end of the own vehicle should exist when the own vehicle is parked in the target parking space).

As described above, when the target trajectory is calculated, the trajectory plan unit 150 sets at least one of the stop positions where the own vehicle should stop as the target stop position T, and calculates the limit position (limit stop position R) further forward over the target stop position T along the target trajectory. Until the own vehicle reaches this limit position, the own vehicle can advance without colliding with the obstacle.

Next, the parking assist device 102 causes the parking operation control unit 152 to perform the parking assist operation in which the steering and the vehicle speed (including the switching between the forward movement and the backward movement) of the own vehicle are automatically controlled so that the own vehicle travels along the calculated target trajectory in the range of the predetermined target vehicle speed (S112).

Next, the parking operation control unit 152 determines whether the own vehicle has reached the target position D in the target parking space on the basis of the current position of the own vehicle calculated by the current position calculation unit 148 (S114), and if the own vehicle has reached the target position (S114, Yes), the own vehicle is stopped and after the end of the parking assist operation (S116), the parking assist process is terminated.

On the other hand, if the own vehicle has not reached the target position D yet (S114, No), the parking operation control unit 152 determines whether the driver performs the accelerating operation on the basis of the sensor information from the sensor group 116 (S118), and if the accelerating operation is not performed (S118, No), the process returns to step S112 and the process is repeated.

Then, if the accelerating operation is performed in step S118 (S118, Yes), the parking operation control unit 152 determines whether the distance along the target trajectory from the current position of the own vehicle to the target stop position T is more than the predetermined distance L1 on the basis of the current position of the own vehicle calculated by the current position calculation unit 148 (S122 in FIG. 5), and if the distance is equal to or less than L1 (S122, No), the process returns to S112 and the process is repeated. Thus, the accelerating operation is ignored and the parking assist operation in accordance with the target vehicle speed is continued.

On the other hand, if the distance from the current position of the own vehicle to the target stop position T along the target trajectory is more than the predetermined distance L1 in step S122 (S122, Yes), the parking operation control unit 152 enables the accelerating operation of the driver (S124) so that the vehicle speed of the own vehicle is changed in accordance with the accelerating operation and the automated steering along the target trajectory is continued so that the parking assist operation is continued. Note that in a case where the acceleration is performed in accordance with the accelerating operation by enabling the accelerating operation of the driver, the acceleration can be performed only within the predetermined acceleration (restricted acceleration).

Next, the parking operation control unit 152 determines whether the accelerating operation of the driver ends (for example, the amount of stepping on the accelerator pedal becomes zero) (S126), and if it ends (S126, Yes), the accelerating operation is disabled (S128) and then, the process returns to step S112 and the parking assist operation is performed in accordance with the predetermined target vehicle speed.

On the other hand, if the accelerating operation of the driver is continued (S126, No), the parking operation control unit 152 determines whether the distance from the current position of the own vehicle to the target stop position T along the target trajectory is within the predetermined distance L2 (S130), and if the distance is not within L2 (S130, No), the process shifts to step S126. Meanwhile, if the distance is within L2 (S130, Yes), the parking operation control unit 152 orders the HMI control unit 146 to warn the driver to stop the accelerating operation for acceleration (S132). The warning can be performed by causing the display unit 110 to display a warning display, and/or causing the speaker 114 in the room of the vehicle to output a warning sound or a warning message.

Then, the parking operation control unit 152 determines whether the driver ends the accelerating operation (S134), and if it ends (S134, Yes), the process shifts to step S128. On the other hand, if the accelerating operation of the driver is continued (S134, No), the parking operation control unit 152 determines whether the distance from the current position of the own vehicle to the target stop position T along the target trajectory is within the predetermined distance L3 (S136), and if the distance is not within L3 (S136, No), the process returns to step S132 and the process is repeated. If the distance is within L3 (S136, Yes), the parking operation control unit 152 disables the accelerating operation (S138) and for example, the own vehicle is decelerated within the predetermined deceleration and/or jerk, so that the own vehicle is stopped in the range not over the limit stop position R (S140). After the own vehicle is stopped in step S140, the parking operation control unit 152 returns the process to step S112 and repeats the process. Thus, after the own vehicle is stopped in the range not over the limit stop position R, the parking assist operation is continued in accordance with the predetermined target vehicle speed.

The predetermined deceleration and jerk can be set to a larger value when the obstacle exists in front of the limit stop position R than when the obstacle does not exist. This can further reduce the possibility that the own vehicle collides with the obstacle in front of the own vehicle over the limit stop position R, and thus, the own vehicle can stop more safely. The predetermined deceleration and jerk can be determined in accordance with the kind of the target stop position T (for example, the stop position to avoid the obstacle, the stop position for the turnabout, or the target position D corresponding to the stop position in the parking space). For example, the aforementioned predetermined deceleration or jerk can be set larger in the case where the target stop position T is the stop position to avoid the obstacle than in the case where the target stop position T is the stop position for the turnabout or the stop position in the parking space.

In step S140 described above, the deceleration is performed within the range of the predetermined deceleration and/or jerk, so that the own vehicle is stopped within the range not over the limit stop position R; however, the present invention is not limited to this procedure. The deceleration may be performed so that the own vehicle is stopped in the range of the predetermined distance (stop distance) after the deceleration is started. The stop distance can be set to be smaller (shorter) when the obstacle exists in front of the limit stop position R than when the obstacle does not exist. This can further reduce the possibility that the own vehicle collides with the obstacle in front of the own vehicle over the limit stop position R, and thus, the own vehicle can stop more safely.

The distances L1, L2, and L3 described above may be, for example, distances where it is predicted to take predetermined times t1, t2, and t3 respectively for the own vehicle traveling at the current vehicle speed along the target trajectory to reach the target stop position T.

As described above, in the present embodiment, when the parking assist operation is performed along the target trajectory, the parking assist device 102 allows the travel of the own vehicle to the limit stop position R over the target stop position T. Then, under the condition that the driver has started the accelerating operation at the position located away from the target stop position T by a distance more than the predetermined distance L1 on the near side, the acceleration in accordance with the accelerating operation is allowed in the range of a distance more than the predetermined distance L3 from the target stop position T, and within the range of the predetermined distance L3, the accelerating operation is disabled to stop the own vehicle in the range to the limit stop position R. Thus, in the present embodiment, the parking assist operation can be performed with the speed desired by the driver and additionally, the own vehicle can be prevented from deviating largely from the target stop position T and colliding with the obstacle, or endangering traffic participants around the own vehicle (such as other vehicle and pedestrian).

In the present embodiment, the obstacle is detected from the images photographed by the front camera 104 and the rear camera 106; however, instead of these or in addition to these, a radar or a laser imaging detection and ranging (LIDAR) device may be provided to detect the obstacle around the own vehicle. With such a radar or a LIDAR device, the obstacle in the environment around the own vehicle can be detected.

Note that the parking assist process in the present embodiment does not include the process of the braking operation by the driver; however, the present invention is not limited to this example. When the driver operates the braking during the parking assist operation, the parking assist process can be canceled and the control of the own vehicle can be returned to the driver's operation. Instead of this, when the driver operates the braking during the parking assist operation, the parking assist operation along the target trajectory may be continued while the deceleration and/or the stop is performed in accordance with the braking operation.

The present invention is not limited to the embodiment described above, and it goes without saying that modifications can freely be made thereto within a scope that does not depart from the essence and gist of the present invention.

What is claimed is:

1. A parking assist device comprising:
a processor configured to:
facilitate planning a target trajectory of an own vehicle from a current position to a target parking space; and
facilitate performing a parking operation in which the own vehicle travels along the target trajectory and is parked in the target parking space,
wherein the processor determines a limit stop position corresponding to a limit position to which the own vehicle can travel along a traveling direction indicated by the target trajectory further forward over at least one target stop position included in the target trajectory,
in response to a driver performing a driving operation during the parking operation, the processor facilitates performance of an acceleration in accordance with the driving operation under a condition that a distance to the target stop position from a position of the own vehicle when the driving operation is performed is larger than a predetermined distance, and
after performing the acceleration, the processor facilitates performance of a deceleration so that the own vehicle stops in a range to the limit stop position.

2. The parking assist device according to claim 1, wherein the predetermined distance is determined as a distance where it is predicted to take a predetermined time for the own vehicle traveling at a current vehicle speed along the target trajectory to reach the target stop position.

3. The parking assist device according to claim 1, wherein the processor facilitates steering and a vehicle speed of the own vehicle and performing a steering control along the target trajectory when the acceleration is performed in accordance with the driving operation by the driver.

4. The parking assist device according to claim 1, wherein the deceleration performed so that the own vehicle stops in the range to the limit stop position is configured to be performed in a manner that a distance where the own vehicle travels after the own vehicle starts the deceleration and before the own vehicle stops is within a predetermined range of a predetermined stop distance, and
the stop distance is shorter when an obstacle exists in front of the limit stop position than when the obstacle does not exist.

5. The parking assist device according to claim 4, wherein the limit stop position is located away from the target stop position by a predetermined travel allowance distance, and
the travel allowance distance is shorter when the obstacle exists in front of the limit stop position than when the obstacle does not exist.

6. The parking assist device according to claim 1, wherein the deceleration performed so that the own vehicle stops in the range to the limit stop position is configured to be performed within a predetermined range of predetermined deceleration or jerk, and
the predetermined deceleration or jerk is determined in accordance with a kind of the target stop position.

7. The parking assist device according to claim 6, wherein the predetermined deceleration or jerk is larger when an obstacle exists in front of the limit stop position than when the obstacle does not exist.

* * * * *